United States Patent [19]

Bunce

[11] 4,030,870

[45] June 21, 1977

[54] REFRIGERATOR CONSTRUCTION AND THE MANUFACTURE OF PANELS THEREFOR

[75] Inventor: Donald A. Bunce, Wirral, England

[73] Assignee: Kelvinator, Inc., Grand Rapids, Mich.

[22] Filed: Oct. 15, 1974

[21] Appl. No.: 514,831

[30] Foreign Application Priority Data

Feb. 21, 1974 United Kingdom ............... 7914/74

[52] U.S. Cl. .......................... 425/383; 425/324 R; 425/388; 425/DIG. 58; 264/92
[51] Int. Cl.² ........................................ B29C 17/02
[58] Field of Search .......... 425/340, 343, 383, 388, 425/324 R, 385, DIG. 58, 394; 270/32, 61; 93/39 R, 49 R, 49 M; 264/90, 92

[56] References Cited

UNITED STATES PATENTS

| | | | |
|---|---|---|---|
| 2,006,060 | 6/1935 | Schilder et al. | 229/62 |
| 2,784,455 | 3/1957 | Pulaski | 425/DIG. 58 |
| 2,892,217 | 6/1959 | Luboskez | 425/394 X |
| 3,149,376 | 9/1964 | Lee | 425/394 X |
| 3,169,274 | 2/1965 | Colombo | 425/324 R |
| 3,577,593 | 5/1971 | Jackson | 425/388 |
| 3,598,463 | 8/1971 | Kesling | 425/388 X |
| 3,640,668 | 2/1972 | Brown, Jr. et al. | 425/DIG. 58 |
| 3,668,033 | 6/1972 | Evans | 425/385 X |
| 3,816,051 | 6/1974 | Houghton | 425/388 |

Primary Examiner—Robert L. Spicer, Jr.
Attorney, Agent, or Firm—McNenny, Pearne, Gordon, Gail, Dickinson & Schiller

[57] ABSTRACT

A panel constructed cabinet for refrigerators, freezers or the like is disclosed along with a method of manufacture and an apparatus for manufacture. The cabinet includes an inner liner formed of panels of thermoplastic material having mating edge connections. The connections are formed by heating the plastic sheet along spaced and parallel lines adjacent to the edges thereof, to provide fold lines permitting the formation of channels proportioned to receive mating tongues from adjacent panels. Along some edges of the thermoplastic panels the channels are formed to extend laterally, with respect to the panel, and along other edges the channels are formed substantially parallel to the panels. The outer casing includes a combination of metallic panels along the sides and foil laminated panels along the top, back and bottom of the cabinet. Foamed insulation rigidifies the panels and provides the necessary insulation therebetween. An apparatus for forming the thermoplastic panels is disclosed which includes means to clamp a sheet of thermoplastic material, means to heat the thermoplastic material along spaced lines, and means to fold the edge portions of the sheet to form the channels used in the assembly.

11 Claims, 26 Drawing Figures

REFRIGERATOR CONSTRUCTION AND THE MANUFACTURE OF PANELS THEREFOR

BACKGROUND OF THE INVENTION

This invention relates to the production of refrigerators and particularly though not exclusively the production of domestic refrigeratos and freezers. It also relates to thermoplastic plastics panels and to methods of making such panels.

PRIOR ART

Domestic refrigerators are currently made from a plastic liner and a metal casing (wrapper) with glass fibre insulation pads placed between them. Both the liner and the casing are formed into an opensided box shape before assembly. This is achieved by a vacuum drawing operation in the case of the liner; for example, a ⅛ inch sheet of polystyrene is heated, vacuum drawn into a female mould with the aid of a male mould member, cooled, removed and trimmed. Although this moulding process can be to some extent automated with, for example, an indexing mechanism, it suffers from the disadvantages that (a) considerable energy is required to heat the polystyrene, (b) heating and cooling take an appreciable time, (c) the thickness of the sheet is reduced where it is deformed by the moulding operation and a relatively thick sheet has to be used, (d) the moulded liners take a considerable amount of storage space. Similarly the metal casings provide a serious storage problem; they are shaped from sheet metal, sprayed to prevent corrosion and painted. Assembly is completed by securing the wiring in position on the liner, securing the pipe work and freezer box unit in position (the latter through a removable panel in the wall of the liner), securing a further insulation pad in position over the removable panel, securing the assembly in the casing and fastening the door in position.

Another method has been found to be successful for making freezers. The liner is made from pre-finished metal sheets which are partially preformed (e.g. to a channel-shaped cross-section) and placed over a wooden mandrel or plug of a simple rectangular shape. A casing is then lowered onto the liner and the whole assembly is placed in a jig. The components of a rigid polyurethane foam are then injected into the space between the casing and the liner and allowed to foam and set. The assembly is thereafter removed from the jig and lifted off the plug.

SUMMARY OF THE INVENTION

In accordance with this invention, a refrigerator or freezer liner is made of interlocking plastics panels, some panel edges being folded to receive other panel edges. These panels can be stored prior to assembly without creating the storage problems encountered with the vacuum drawn liners and thinner plastic sheet can be used. Thus, according to one aspect of the invention, a refrigerator or freezer comprises an outer casing, a liner and foamed plastics insulation material set in situ between the liner and the casing and serving to rigidify the construction, wherein the liner comprises a plurality of panels of thermoplastic sheet plastics material secured in position by the plastics insulation material, certain of the panel edges being folded along at least two substantially parallel fold lines to provide channels for receiving edges of adjacent panels and/or part of the outer casing. With this arrangement it is possible both to accurately locate the panels prior to injection of the liquid insulating material and to reduce the risk of this insulating material leaking into the interior of the liner. The panels are desirably of 0.04 inch polystyrene though other materials such as ABS, polypropylene and PVC can be used (they should not be affected by any blowing agents such as Freons in the foamed plastic).

Although the liner may be made up in a number of ways, a convenient arrangement is to make it up from four plastics panels viz. a back and bottom panel, two side panels and a top panel. With such an arrangement the channels can conveniently be formed along all four edges the side panels, the bottom and rear channels engaging the edges of the back and bottom panel, the top top channel engaging the edges of the and the front channel engaging a flange on a metal casing member. The shelf runners could be preformed in the side panels for example by a conventional vacuum forming operation. A step can be formed in the back and bottom panel to provide the usual housing for motor and compressor.

Although the casing can be conventional, it is preferred to form it from a combination of sheet metal and a material to which the sheet can be secured by nails, screws, staples or the like, such as wood, structural plastics and fibre glass. Although wood can be used, it is not the ideal product as it is subject to insect attack and has to be specially treated. A particularly suitable material is sold under the name KABOR; it consists of an injection-mouldable material made up of polyethylene and paper and is strong and cheap. Different climatic conditions require different insulation thicknesses and this can be adjusted by using casings with different flange heights, the flanges being connected to the liner panels as previously described particularly along the two vertical sides of the front opening of the liner. The top and the bottom of the casing may conveniently be constituted by a rectangular frame of Kabor to which horizontal flanges on the side panels of the casing are secured e.g. by stapling. The frame conveniently has tapered joints on two opposite sides so that its width can be adjusted to the particular insulation thickness being employed. The top and bottom front face members of the casing can be completed by metal plates secured to the frames connecting them to the top and bottom of the front of the liner. The back and top and bottom of the casing is conveniently constituted by aluminum foil coated cardboard held in position prior to injection of the polyurethane foam by for example polystyrene block spacers or by suction against a supporting wall in the jig.

According to another aspect of the invention, there is provided a thermoplastic plastics panel having a channel along at least one edge formed by holding along at least two substantially parallel fold lines. The channel may face outwardly along the surface of the panel or at right angles to the channel.

According to a further aspect of the invention there is provided a method of making such a panel wherein the panel is heated along two spaced parallel lines and subsequently folded while the plastics material is still thermoplastic. Preferably at least one fold is formed at least partially by gravity. It is also preferred that a folding tool is used which inserts a tongue into the channel to determine its width until the plastics material hardens.

BRIEF DESCRIPTION OF THE DRAWINGS

One form of the invention will now be described by way of example with reference to the accompanying drawings in which:

FIGS. 19 to 14 illustrate diagrammatically successive stages in the provision of the rear channel in the panel;

DETAILED DESCRIPTION OF THE DRAWINGS

As previously described the liner is made up from four interconnected polystyrene panels, a back and bottom panel, two side panels and a top panel. The casing is made up from two flanged metal sheets secured to the liner at the front and to Kabor frames at the top and the bottom. The top, bottom and back of the casing are constituted by aluminum foil coated cardboard secured to the Kabor frames or to flanges on the casing side panels. Rigid thermal-insulating polyurethane foam (injected in liquid form) fills the space between the casing and the liner and secures them together.

Figure 1:
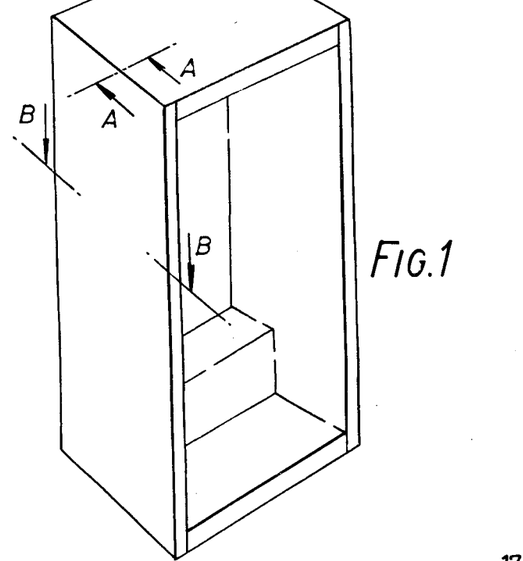
FIG. 1 is a perspective general view of a refrigerator in accordance with the invention.
Figures 2, 3:
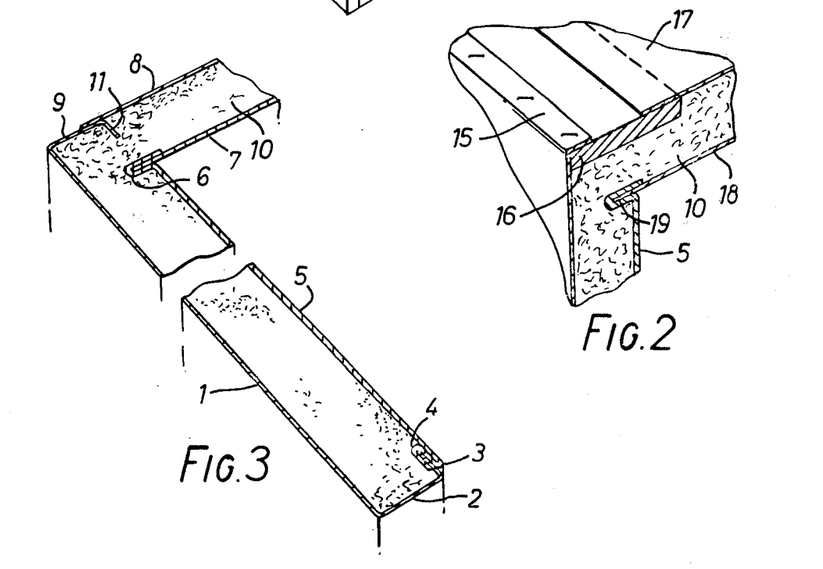
FIG. 2 is a section on the line A—A of FIG. 1.
FIG. 3 is a section on the line B—B of FIG. 1.
Figure 4:
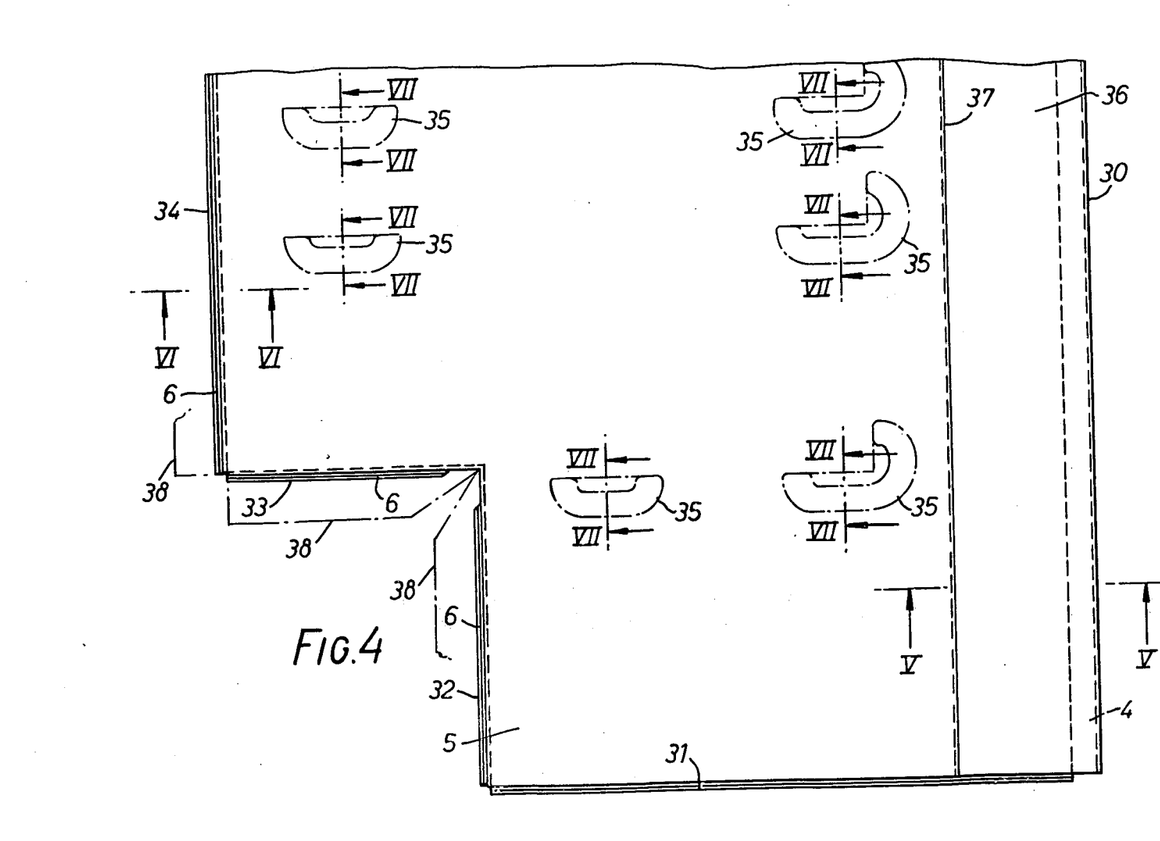
FIG. 4 is an inside elevation of the lower end of a liner panel used in the refrigerator of FIG. 1.

Referring now in more detail to FIGS. 1 to 3 of the drawings, the metal casing side panel 1 has a front flange 2 with a bent-back end 3 snugly engaging in a front channel 4 of a polystyrene liner side panel 5. The channel 4 is formed by two bends at the front edge of the panel 5. A similar channel 6 is formed at the back edge of the panel 5 but faces inward at right angles to the plane of the panel 5 to receive the end of the stepped back and bottom panel 7. An aluminum foil coated sheet of cardboard 8 constitutes the back panel of the casing and rests on a flange 9 of the panel 1. The space 10 between the liner and the casing is filled with rigid thermal-insulating polyurethane foam. A flange 11 extends inward into the space 10 to lock the side panels firmly into position.

The panel 1 has a top flange 15 to the underside of which is stapled (or screwed etc.) a rectangular Kabor frame 16. The frame has tapered joints (not shown) at the front and the back to permit adjustment of its width. The top of the casing is constituted by a sheet 17 of aluminum foil coated cardboard similar to the sheet 8.

FIG. 2 also shows the interconnection of the liner side panel and a liner top panel 18 by a channel 19 formed in the panel 5; a similar channel is formed along the bottom of the panel 5. The remainder of the casing and the liner have a similar construction to the parts described above and a detailed description is therefore not necessary.

The assembly techniques used are similar to those currently used to produce freezers with metal liner panels and it will be seen that a refrigerator or freezer can be produced quickly and economically using the construction according to the invention.

Figure 5:
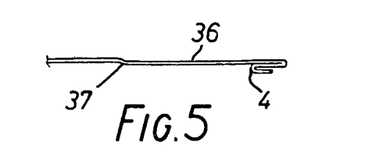
FIG. 5 is a cross-section of FIG. 4 on the line V—V.
Figure 6:
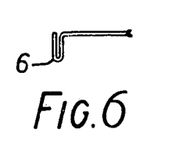
FIG. 6 is a cross-section of FIG. 4 on the line VI—VI.
Figure 7:
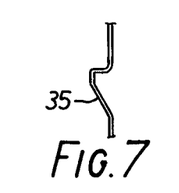
FIG. 7 is a cross-section of FIG. 4 on any of the lines VII—VII.

FIGS. 4 to 7 show the lower end of the panel 5 in more detail. In particular, it has a front edge 30, a bottom edge 31, a cut out corresponding to the step in the panel 7 and providing the vertical and horizontal edges 32, 33 respectively, and a rear edge 34. Self runners 35 (see also FIG. 7) are formed in conventional manner by vacuum drawing as will hereinafter be described. It will be appreciated that the profile of channel 4 (FIG. 5) which extends along the front edge 30, differs from the profile of the channel 6 (FIG. 6) which extends along the other edges 31-34. As shown in FIG. 5, there is a slight outward displacement of the front section of the panel 36 along line 37 but this is largely for aesthetic reasons. Ghost lines 38 show by way of example the shape of the original blank for the panel 5 at two of the corners.

Figure 8:
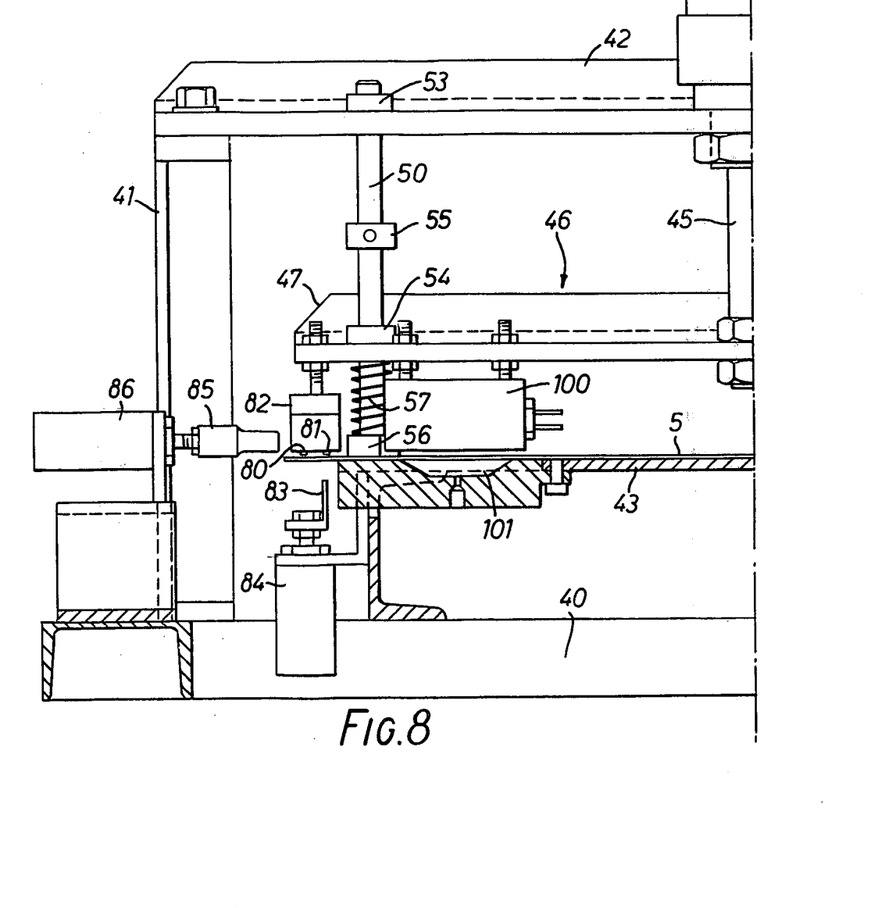
FIG. 8 is a vertical section through apparatus for forming the panel of FIG. 4.
Figure 9:
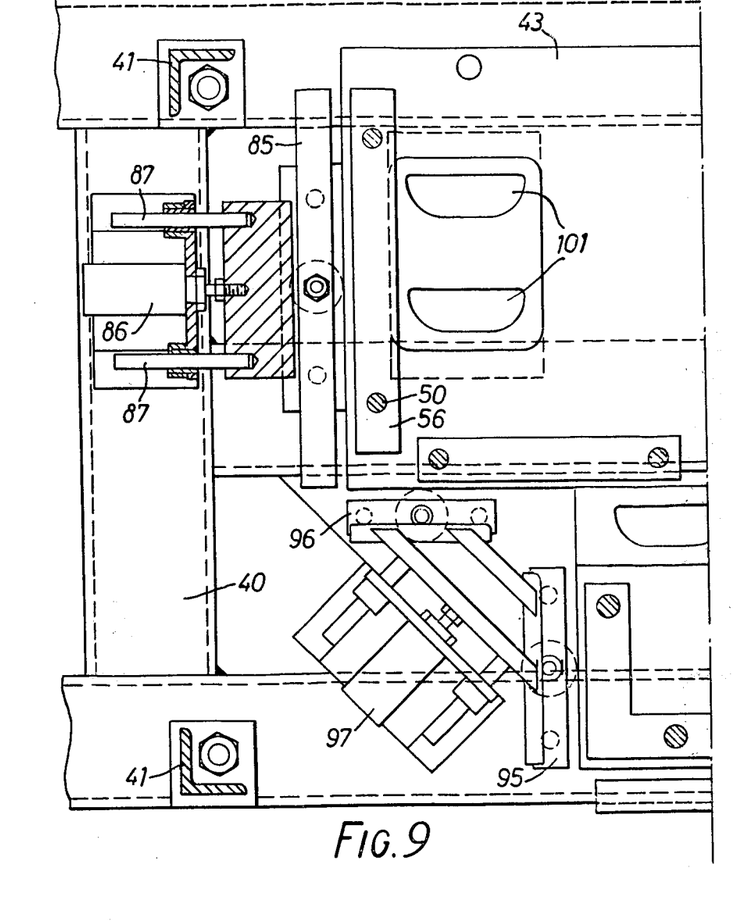
FIG. 9 is a horizontal section through the apparatus of FIG. 8.

Turning now to FIGS. 8 and 9, the apparatus for forming the channels 4 and 6 and the runners 35, comprises a base 40 from which four uprights 41 extend to support an upper plate 42 extending across a working table 43 mounting on the base 40. Mounted centrally on the upper plate 42 is a hydraulic or pneumatic ram 44 having a piston rod 45 which carries an operating head 46. The operating head 46 comprises a vertically movable plate 47 from which depend instruments for performing operations on a panel 5 on the table 43. The operating head 46 is guided by rods 50, 51, 52, which are slidable both in bearings 53 in the upper plate 42 and in bearings 54 in the operating head 46. Stops 55 on the rods 50–52 ensure that when the head 46 is lifted to its uppermost position, it carries the rods 50–52 with it to release the panel 5. As shown, the head 46 is in its fully lowered position and the panel 5 is clamped to the table 43 by mold steel clamp pads 56 bolted to the lower ends of rods 50–52. In this position of head 46, the pads 56 are urged downwardly by the compression springs 57 acting between the head 46 and the pads 56. In operation, the panel 5 (or more accurately the blank therefor), is placed in position with the head 46 and rods 50–52 raised. The head 46 and the rods 50–52 are then lowered to clamp the panel 5 in position, the rods 50–52 stopping when the pads 56 engage the panel 5 but the head 46 continuing to descend to the FIG. 8 position. Owing to the presence of the springs 57, the head 46 can subsequently be partly raised to permit folding operations without the panel being released.

Figure 10:
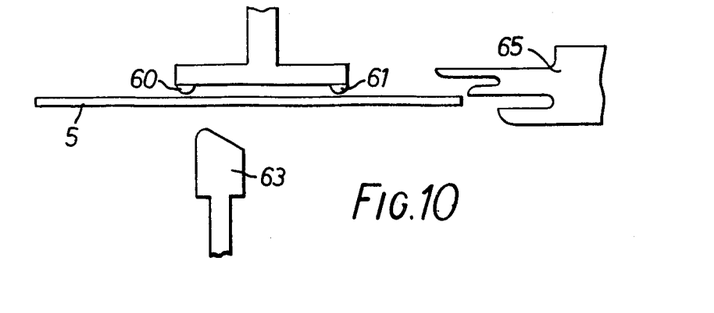
FIGS. 10 to 18 illustrate diagrammatically successive stages in the provision of the front channel in the panel.
Figure 11:
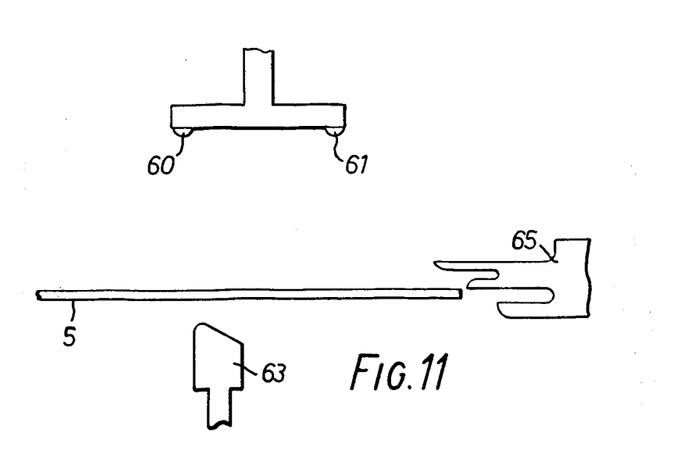
Figure 12:
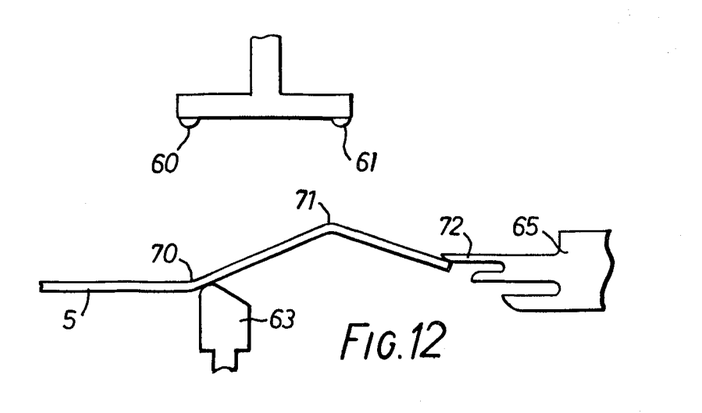
Figure 13:
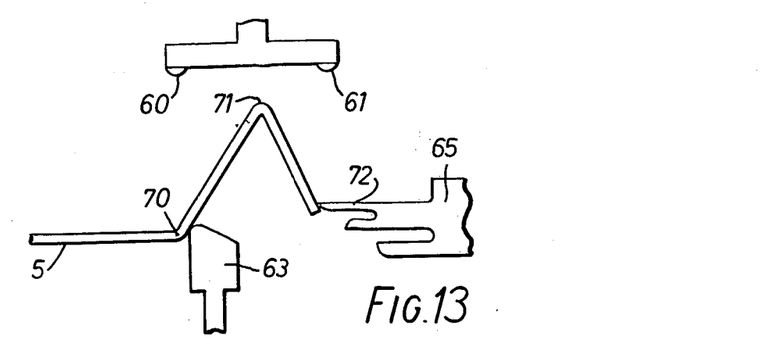
Figure 14:
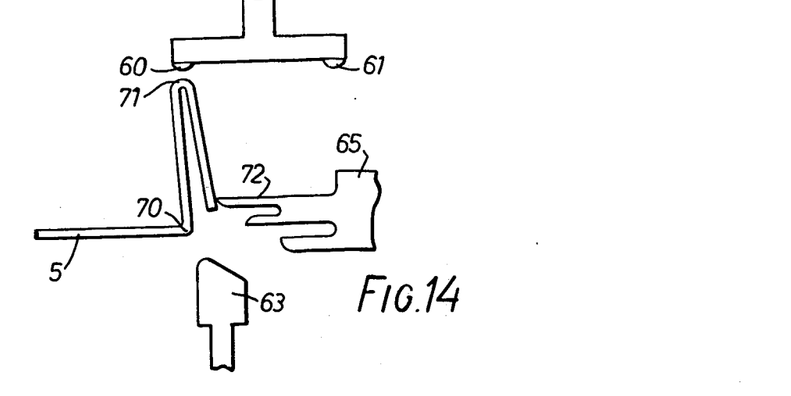
Figure 15:
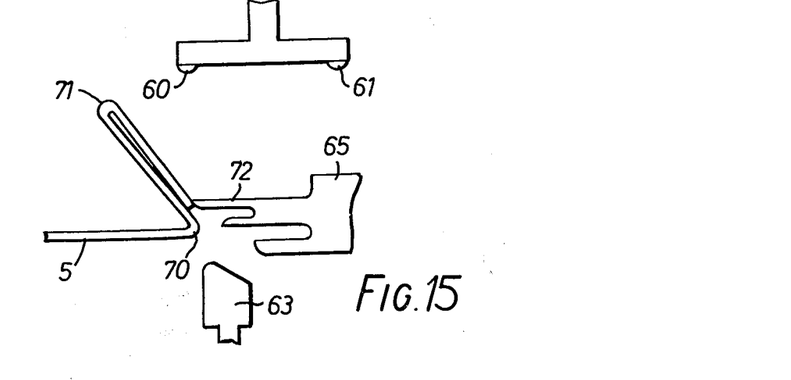
Figure 16:
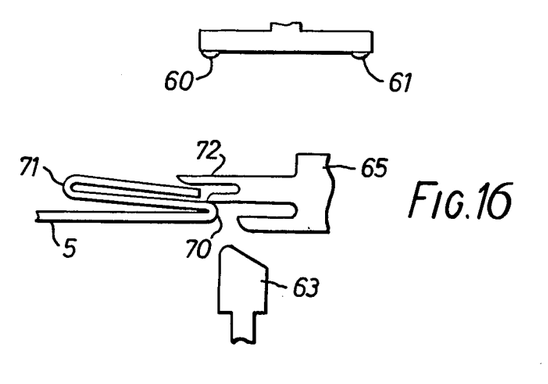
Figure 17:
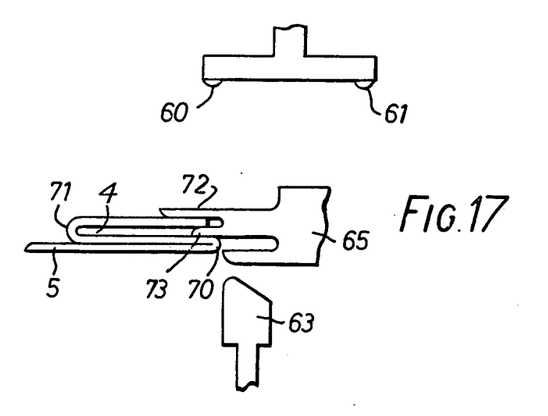
Figure 18:
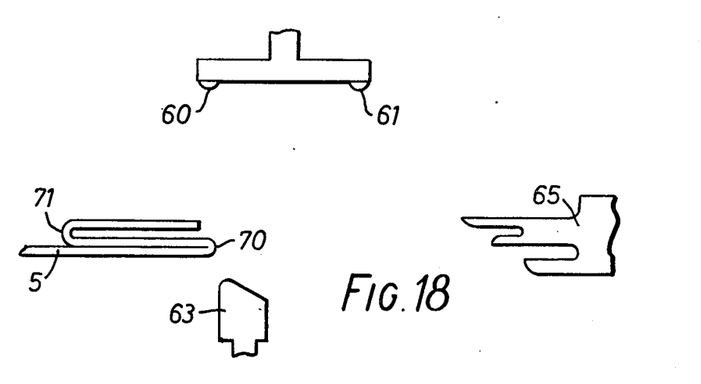

The channel 4 is formed in the edge 30 by means of line heating elements 60, 61 on a carrier 62 bolted to the head 46, a pair of vertically movable formers 63 carried by a ram 64, and a pair of horizontally movable swageing heads 65 carried by a ram 66, all of which are located beyond the edge of the table 43. The swageing heads 65 are kept in alignment by guide rods 67 (FIG. 9) and the formers by similar guide rods 68 (FIG. 8). In FIG. 10 the elements 60, 61 have descended to heat the panel along spaced lines 70, 71. After their upward withdrawal (FIG. 11), the former 63 is raised to contact and initially apply a folding force to a relatively unheated portion of the panel 5 slightly to the right of line 70 so that the panel bends at line 70 and also at line 71 due to the contact with subsequent inward movement of an upper tongue 72 of the swageing head 65 (FIGS. 12 and 13). Folding continues due to continued movement of the swageing head 65 (FIGS. 14–16), the former 63 in the meantime being lowered. A lower tongue 73 of the swageing head 65 forms, with the upper tongue 72, a groove to receive the panel edge and the height of the tongue 73 therefore determines the width of the channel 4 in the panel (FIG. 17). The lower face of the end of the tongue 72 and the upper face of the end of the tongue 73 are appropriately bevelled to provide a lead-in. In FIG. 18, the panel 5 has become rigid at the lines 70, 71 and the swageing head 65 has been withdrawn.

Figure 19:
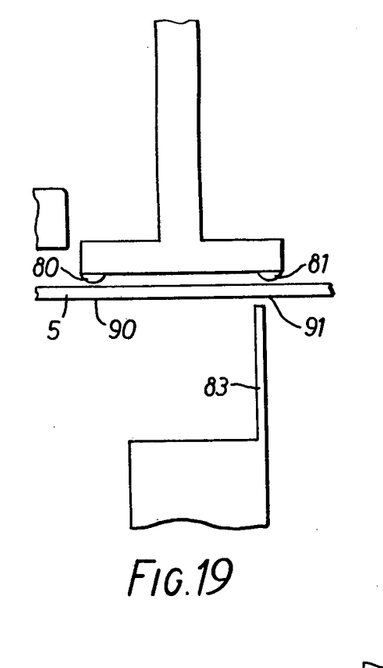
Figure 20:
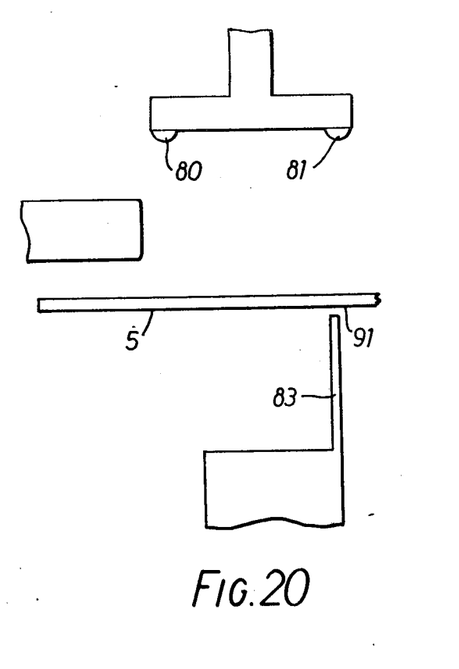
Figure 21:
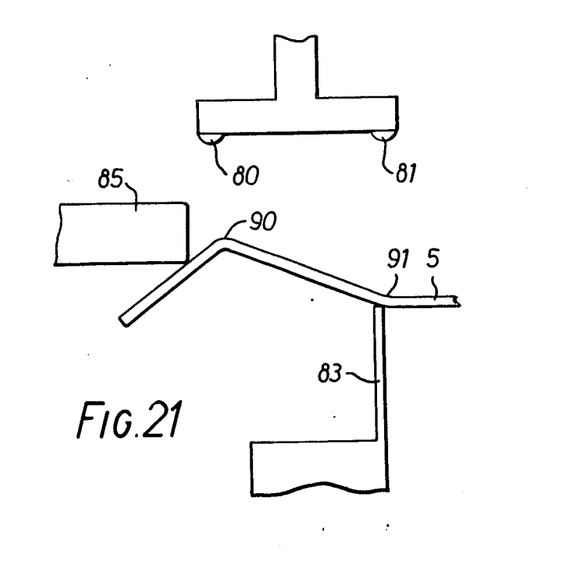
Figure 22:
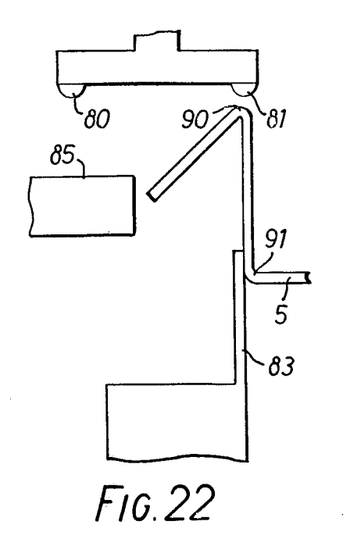
Figure 23:
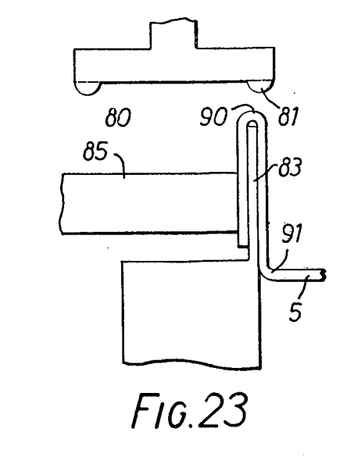
Figure 24:
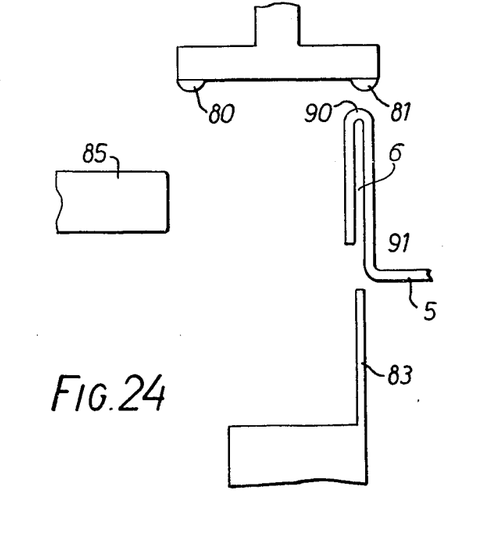

The channel 6 is formed in the edge 34 by means of line heating elements 80, 81 on a carrier 82 bolted to the head 46, a tongue-like vertically movable former 83 carried by a ram 84, and a horizontally movable folding head 85 carried by a ram 86, all of which are located beyond the edge of the table 43. The folding head 85 is kept in alignment by guide rods 87 (FIG. 9). In FIG. 19 the elements 80, 81 have descended to heat the panel 5 along spaced lines 90, 91. After their upward withdrawn (FIG. 20), the former 83 is raised to contact the panel 5 slightly to the left of line 91 so that the panel 5 bends at line 91 and also at line 90 due to the contact with and subsequent inward movement of the folding head 85 (FIGS. 21–23). The former 83 enters the channel 6 formed in the panel and determines its width. After the panel has become rigid along lines 90, 91, the former 83 and the folding head 85 are withdrawn.

The channel 6 is formed in edges 31, 32, 33 by similar members (not shown in FIG. 8). It will be seen from FIG. 9 that the folding heads 95, 96 for edges 32, 33 are carried by a single ram 97 similar to the ram 86 but disposed at 45° to both edges. Movements of the folding heads 95, 96 have therefore a longitudinal component with respect to the panel edges but this has not been found to be disadvantageous.

The shelf runners are formed by conventional heaters 100 (two shown in FIG. 8) mounted on the head 40 and vacuum drawing recesses 101 in the table 43.

A line heating element 105 on a carrier 106 bolted to the head 46 permits the panel to bend along line 37 under the pressure of two adjacent pads 56.

It will be appreciated that for different sizes of panels 5 (provided that the edges 31, 32 remain unaltered and the folding members are sufficiently long), it is only necessary to adjust the position of the front folding mechanism inwardly or outwardly as necessary.

Other panel arrangements can be used and the channels need not necessarily be on the side panels. It is of course an advantage that only of the two panels forming a joint need be modified to provide a channel.

It is believed that the operation of the apparatus shown in FIGS. 8 and 9 will be clear from the above description. Briefly, the head 46 descends to clamp a panel in position on the table 43. The line heating elements are activated and as soon as the panel has been sufficiently heated the head 46 is partially withdrawn upwardly to provide room for the forming operation. The forming operation for all four panel edges is carried out simultaneously as just described. At the same time, the runners 35 are formed by vaccum forming operations, the heaters 100 being activated at the same time as the line heaters.

Figure 25:
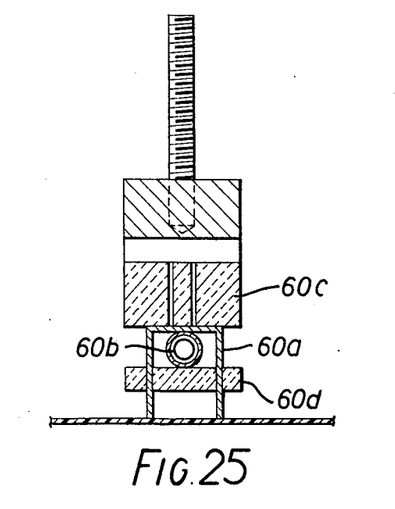
FIG. 25 illustrates a transverse section of a modified heater structure for heating the blank prior to the forming operation.
Figure 26:
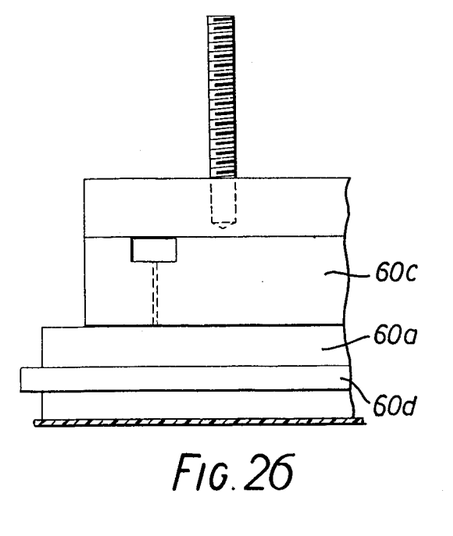
FIG. 26 illustrates a side elevation of one end of the heater of FIG. 25.

In a modification of the illustrated apparatus, shown in FIGS. 25, 26, a different form of heater is used. The line heating elements are replaced by an inverted rectangular channel shaped metal member 60a. Inside this metal member and in contact with its upper side (the bottom of the channel) is a longitudinal sheathed wire electric heating element 60b e.g. of 8 to 12 watts per inch. Above the upper side of the metal member is an asbestos block 60c against which it rests. Optionally a further asbestos block 60d with two longitudinal slots to receive the metal member arms is mounted on the metal member below the element. The metal member can thus convey the heat downwardly to the panel and permits better control of the bend line. The element and the first asbestos block can be part of a conventional heating unit.

Although preferred embodiments of this invention are illustrated, it should be understood that various modifications and rearrangements of parts may be resorted to without departing from the scope of the invention disclosed and claimed herein.

What is claimed is:

1. An apparatus for forming thermoplastic panels for refrigerators, freezers or the like comprising clamp means for clamping in a fixed position a flat sheet of thermoplastic material, said sheet having a plurality of peripheral edges, heater means operable to simultaneously heat selected peripheral portions of said sheet along at least two spaced lines, said lines being adjacent and parallel to each other and to at least one of said edges, and fold means operable to fold peripheral portions of said sheet along said lines to form a channel of predetermined width, said fold means initially applying a force to a relatively unheated peripheral portion of said sheet after said selected peripheral portions have been heated, said force causing peripheral portions of said sheet to fold along said lines.

2. An apparatus as set forth in claim 1 wherein said fold means includes a first mechanism operable to apply a force to said sheet along an intermediate portion between said lines to cause said intermediate portion to fold laterally of said sheet.

3. An apparatus as set forth in claim 2 wherein said fold means includes a second mechanism operable to apply a force to an outer portion of said sheet to collapse said outer portion inwardly, said outer portion being located between said intermediate portion and one of said peripheral edges.

4. An apparatus as set forth in claim 3 wherein one of said mechanisms includes a tongue for insertion between said intermediate portion and said outer portion to provide a predetermined spacing therebetween and to determine the width of said channel.

5. An apparatus as set forth in claim 4 wherein said heater means are retractible to permit folding of both of said portions by said first and second mechanisms.

6. An apparatus as set forth in claim 5 wherein said tongue is provided by said first mechanism and said channel is formed to extend substantially perpendicular to the plane of said sheet.

7. An apparatus as set forth in claim 5 wherein said tongue is provided by said second mechanism and said channel is formed to extend substantially parallel to said sheet.

8. An apparatus as set forth in claim 5 wherein heater means and fold means are provided along each edge of said sheet to form a channel substantially completely around said sheet, said fold means forming a first channel along a portion of said sheet which extends substantially perpendicular to said sheet and a second channel along another portion of said sheet which extends substantially parallel to said sheet.

9. An apparatus as set forth in claim 1 wherein said heaters are retractible to allow folding of said sheet along said spaced lines and said fold means includes a member movable laterally of said sheet to engage and laterally fold an intermediate portion of said sheet between said lines and the second member movable in a direction parallel to the plane of said sheet operable to engage the outer portion of said sheet outward of both of said lines to move such outer portion inwardly relative to said sheet.

10. An apparatus for forming thermoplastic panels for refrigerators, freezers or the like comprising a movable clamp assembly for clamping in a fixed position a flat sheet of thermoplastic material, said sheet having a plurality of straight peripheral edges, a heater having two spaced heat producing elements operable to simultaneously heat selected peripheral portions of said sheet along two spaced lines, said lines being adjacent and parallel to at least one of said straight edges, and a folding mechanism having two movable members operable to fold peripheral portions of said sheet along said lines when said selected peripheral portions are heated, one of said members including a tongue adapted to form a channel of predetermined width as peripheral portions of said sheet are folded, at least one of said members initially applying a force to a relatively unheated peripheral portion of said sheet after said selected peripheral portions have been heated said force causing peripheral portions of said sheet to fold along said lines.

11. An apparatus according to claim 10, wherein said heater is retractable to allow one of said movable members to move laterally of said sheet contacting said sheet between said lines, and the other of said movable members to move in a direction parallel to said sheet, said movable members cooperating to simultaneously fold said sheet along said lines when said portions are heated.

* * * * *

UNITED STATES PATENT AND TRADEMARK OFFICE
CERTIFICATE OF CORRECTION

PATENT NO. : 4,030,870
DATED : June 21, 1977
INVENTOR(S) : Donald A. Bunce

It is certified that error appears in the above-identified patent and that said Letters Patent are hereby corrected as shown below:

Under the caption "Background of the Invention", Column 1, Line 8, change "refrigeratos" to -- refrigerators --.

Under the caption "Summary of the Invention", Column 1, Line 61, change "in situ" to -- *in situ* --.

Under the caption "Summary of the Invention", Column 2, Line 16, following the words "the edges of the" insert -- top panel --. Also, Column 2, Line 16 of "Summary of the Invention, delete the word --"top'-- (second occurrence).

Under the caption "Summary of the Invention", Column 2, Line 56, change "holding" to -- folding --.

Under the caption "Brief Description of the Drawings", Column 3, Line 22, change "14" to -- 24 --.

Under the caption "Brief Description of the Drawings", Column 4, Line 13, change "Self" to -- Shelf --.

Under "Brief Description of the Drawings", Column 4, Line 29, change "mounting" to -- mounted --.

UNITED STATES PATENT AND TRADEMARK OFFICE
CERTIFICATE OF CORRECTION

PATENT NO. : 4,030,870
DATED : June 21, 1977
INVENTOR(S) : Donald A. Bunce

It is certified that error appears in the above-identified patent and that said Letters Patent are hereby corrected as shown below:

Under "Brief Description of the Drawings", Column 4, Line 42, change "mold" to -- mild --.

Under "Brief Description of the Drawings", Column 5, Line 25, change "drawn" to -- drawal --.

Under "Brief Description of the Drawings", Column 5, Line 54, following the words "advantage that only" insert -- one --.

Signed and Sealed this

Fifteenth Day of November 1977

[SEAL]

Attest:

RUTH C. MASON
Attesting Officer

LUTRELLE F. PARKER
Acting Commissioner of Patents and Trademarks